(12) United States Patent
Miwa et al.

(10) Patent No.: US 8,633,824 B2
(45) Date of Patent: Jan. 21, 2014

(54) CHARGER

(75) Inventors: Tatsuya Miwa, Maibara (JP); Atsumasa Kubota, Hikone (JP); Norihiro Iwamura, Nagaokakyo (JP); Masaaki Okada, Hikone (JP); Naoki Tsuruta, Hikone (JP); Masaki Ikeda, Hikone (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 12/659,867

(22) Filed: Mar. 24, 2010

(65) Prior Publication Data

US 2010/0245099 A1 Sep. 30, 2010

(30) Foreign Application Priority Data

Mar. 26, 2009 (JP) ................................ 2009-077709

(51) Int. Cl.
*G08B 21/00* (2006.01)
(52) U.S. Cl.
USPC ...................... 340/635; 340/636.1; 340/636.2
(58) Field of Classification Search
USPC .................. 340/635; 320/107, 132
See application file for complete search history.

(56) References Cited

U.S. PATENT DOCUMENTS

| 6,172,480 B1 | 1/2001 | Vandelac |
| 6,238,076 B1 | 5/2001 | Pascale et al. |
| 6,304,060 B1 * | 10/2001 | Dernehl .................. 320/132 |
| 2002/0149344 A1 | 10/2002 | Harvey |
| 2004/0135548 A1 * | 7/2004 | Takano et al. .......... 320/132 |
| 2006/0245131 A1 | 11/2006 | Ramey et al. |
| 2007/0205908 A1 * | 9/2007 | Du et al. .................. 340/636.1 |
| 2007/0290874 A1 * | 12/2007 | Nearhoof et al. ........ 340/815.46 |
| 2008/0174269 A1 | 7/2008 | DeRome et al. |
| 2008/0231229 A1 * | 9/2008 | Aradachi et al. .............. 320/107 |
| 2008/0258679 A1 | 10/2008 | Manico et al. |

FOREIGN PATENT DOCUMENTS

| CN | 1882137 A | 12/2006 |
| GB | 2337898 | 1/1999 |
| JP | H03-007025 | 1/1991 |
| JP | H11-110660 | 4/1999 |
| JP | 2002-056901 | 2/2002 |
| JP | 2003-050053 | 2/2003 |
| JP | 2005-117172 | 4/2005 |
| JP | 2005-278371 | 10/2005 |
| JP | 2006-339140 | 12/2006 |
| JP | 2007-074897 | 3/2007 |
| JP | 2007-101509 | 4/2007 |
| JP | 2008-017283 | 1/2008 |

OTHER PUBLICATIONS

Chinese Office Action in corresponding Chinese Application No. 201010150522.1, dated Aug. 1, 2012 with English translation.
European Search Report dated Dec. 7, 2012.
Office Action dated Jun. 25, 2013 issued in corresponding Japanese application No. 2009-077709 (w/ English summary).

* cited by examiner

*Primary Examiner* — Kerri McNally
(74) *Attorney, Agent, or Firm* — Bacon & Thomas, PLLC

(57) ABSTRACT

A charger for an electric power tool includes a charging unit for charging a secondary battery detachably attached to the charger; a notification unit for notifying an operation state of the charging unit by using a combination of a turn-on and turn-off of the notification unit; a brightness reducing unit for reducing a light brightness of the notification unit; and a controller for controlling the notification unit and the brightness reducing unit. If an operation state of the charging unit satisfies a specific condition, the controller controls the brightness reducing unit to reduce the light brightness of the notification unit.

14 Claims, 11 Drawing Sheets

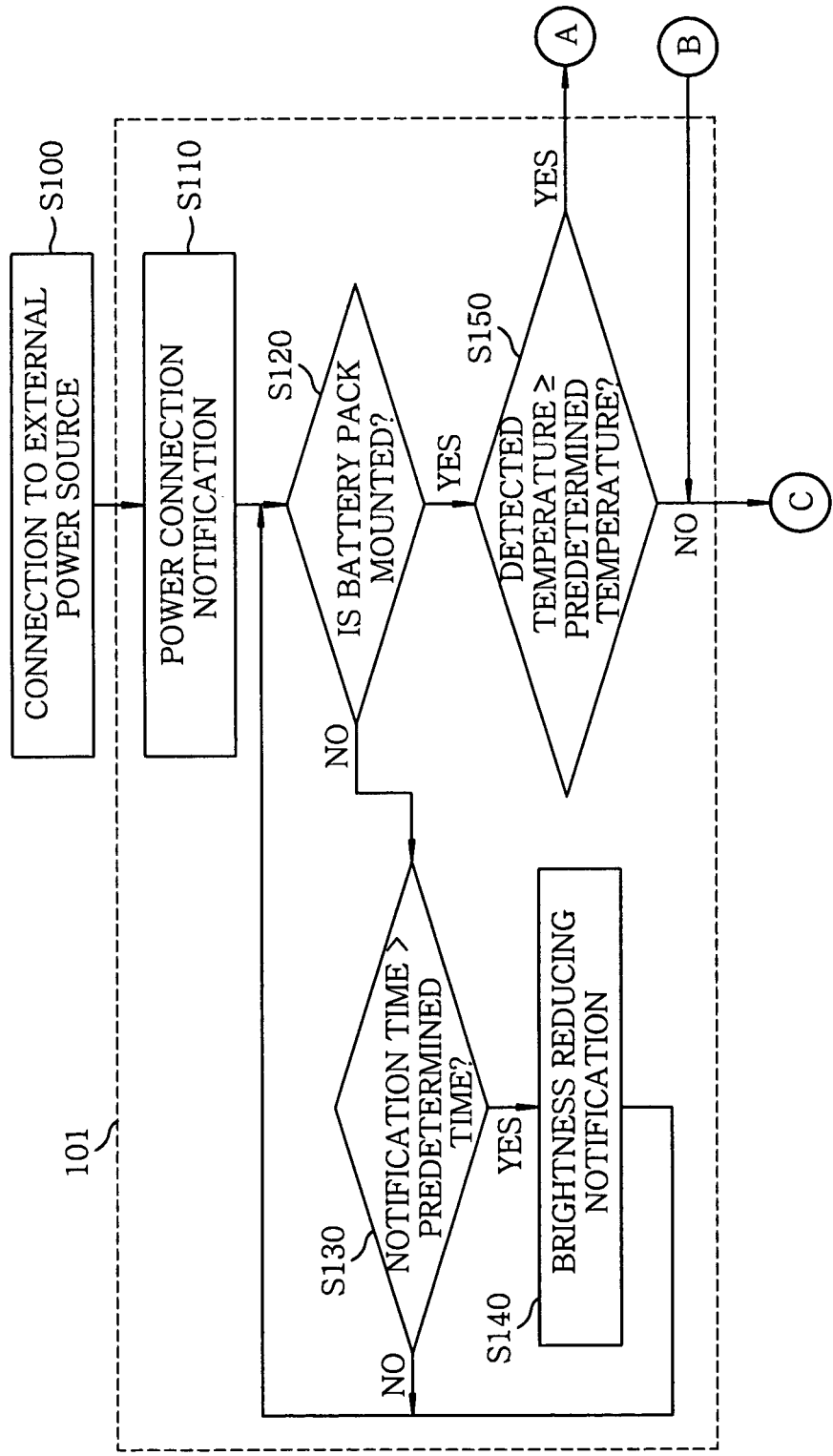

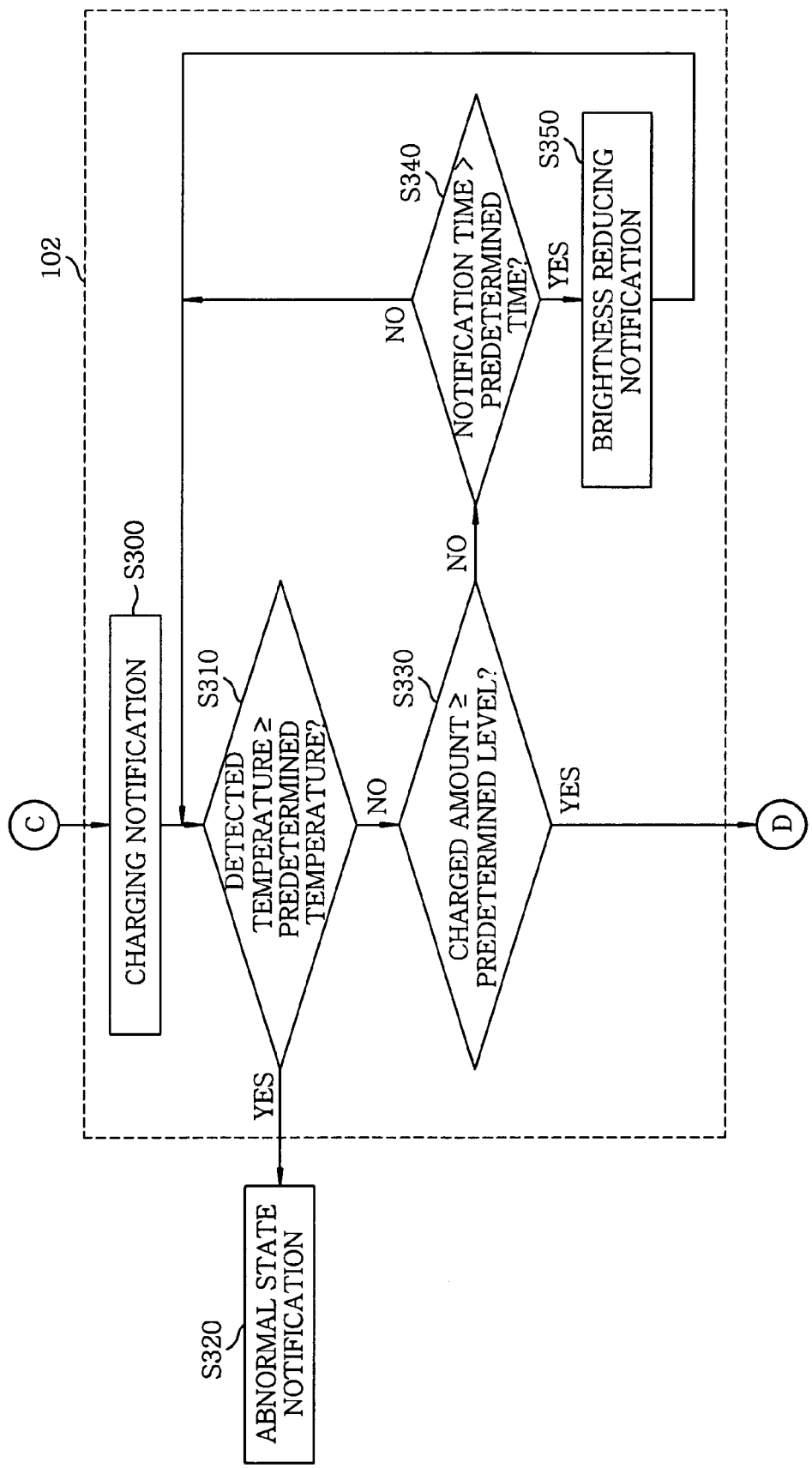

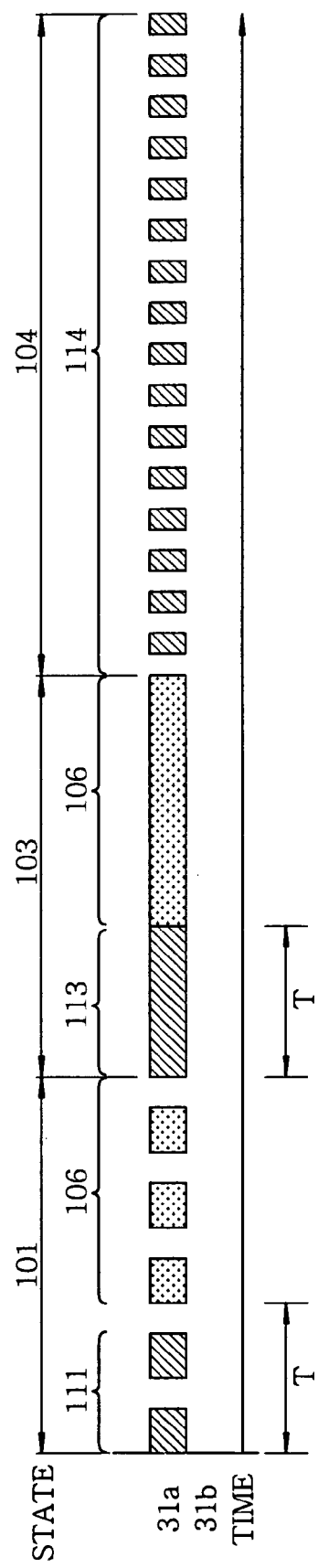

CHARGER

FIELD OF THE INVENTION

The present invention relates to a charger; and, more particularly, to a charger for an electric power tool which charges a secondary battery of the electric power tool.

BACKGROUND OF THE INVENTION

A charger for an electric power tool has been in general configured to notify a user of a power connection state where the charger is connected to an external power source, a charging state where a secondary battery mounted therein is being charged, a charging completion state where the charging has been completed, and the like by using a light emitting member, e.g., a light emitting diode (LED).

A charging time needed to charge a secondary battery varies depending on the capacity and type of the secondary battery. The charging time typically ranges from about 15 minutes to about 60 minutes or more.

For that reason, it is important to a user to notify of the charging completion state. Accordingly, there has been developed a conventional charger having, e.g., two different color LEDs which notifies the user of various operation states until the charging is completed by using combinations of turn-on and turn-off of respective different color lights of the LEDs (see, e.g., Japanese Patent Application Publication No. 2004-173376 and corresponding US Patent Application Publication No. 2004-0135548 A1).

Further, there has been developed another conventional charger that notifies the user of various operation states by changing a current supplied to an LED therein to thereby change brightness of the light emitted (see, e.g., Japanese Patent Application Publication No. 2008-236880 and corresponding US Patent Application Publication No. 2008-0231229 A1). For example, the charger gives a user a notification of the charge completion state by supplying a current larger than that for other notification to the LED so that the LED emits light brighter than other notifications to thereby make the user recognize the charge completion state easily.

However, all the above-described chargers notify an outside world of the charging states by emitting the light without varying brightness regardless whether or not there is a user around the chargers.

In other words, such conventional chargers allow their notification units to continuously emit lights to give a notification to an outside world during the long-term charging period of a battery even when the notification becomes unnecessary due to the absence of a notification target, e.g., a user around the chargers. Accordingly, the power is wasted by the notification units.

SUMMARY OF THE INVENTION

In view of the above, the present invention provides a charger for an electric power tool, capable of selectively decreasing a power consumption of its notification unit by reducing a light brightness of the notification unit under a specific condition.

In accordance with an embodiment of the present invention, there is provided a charger for an electric power tool. The charger includes a charging unit for charging a secondary battery detachably attached to the charger; a notification unit for notifying an operation state of the charging unit by using a combination of a turn-on and turn-off of the notification unit; a brightness reducing unit for reducing a light brightness of the notification unit; and a controller for controlling the notification unit and the brightness reducing unit. If an operation state of the charging unit satisfies a specific condition, the controller controls the brightness reducing unit to reduce the light brightness of the notification unit.

With such a configuration, the display unit can give an original brightness notification and a brightness reducing notification. This is because, if an operation state of the charging unit satisfies the specific condition, the controller controls the brightness reducing unit to reduce the light brightness of the notification unit to give the brightness reducing notification.

If a predetermined time has elapsed during the operation state without change, the controller may control the brightness reducing unit to reduce the light brightness of the notification unit.

The charger may further include a brightness reducing time changing unit for changing the predetermined time.

The charger further may include a brightness adjusting unit for adjusting a reduced light brightness of the notification unit.

If the operation state of the charging unit is changed while a notification is being given by reducing the light brightness of the notification unit, the controller may recover to an original level of the brightness from the brightness reduced by the brightness reducing unit; and control the notification unit to notify the outside world of the changed operation state.

If the charger is in a specific operation state, the controller may control the brightness reducing unit not to reduce the light brightness of the notification unit.

The charger may further include a body sensor for sensing a user's body. While the user's body is sensed by the body sensor, the controller controls the brightness reducing unit not to reduce the light brightness of the notification unit.

As described above, the charger for an electric power tool in accordance with the present embodiments gives the original brightness notification and the brightness reducing notification. Accordingly, the power consumption can be reduced while it is not necessary to manipulate the charger, for example, while the charging is performed.

Further, by making the specific condition mentioned above be based on a long time elapsed since each operation state of the charger, the brightness reducing notification can be given by reducing the light brightness of the notification unit, thereby decreasing the power consumption of the notification unit.

By providing the brightness reducing time changing unit, it is possible to change a period of time of maintaining the brightness reduced notification as desired by a user.

By making the reduced brightness adjustable, it is possible to adjust a brightness level of the notification unit as desired by a user.

When an operation state is changed to another operation state while the light brightness of the notification unit is reduced, the changed operation state is notified by recovering the reduced brightness to an original level of brightness. Accordingly, it is possible to allow a user to easily recognize the change in the operation state.

By allowing the brightness not to be reduced for a specific operation state, the original brightness notification can be maintained during a state in which a user is required to perform an external manipulation, for example, a charge completion state or an abnormal state. Further, the external manipulation can be easily requested and the convenience for usage of the charger and the safety for the user can be improved.

Since it is checked whether or not a user is present around the charger by providing the body sensor, the brightness reducing notification can be given when a notification target, i.e., a user is not present therearound, thereby reducing the power consumption without losing the convenience for usage.

BRIEF DESCRIPTION OF THE DRAWINGS

The objects and features of the present invention will become apparent from the following description of embodiments, given in conjunction with the accompanying drawings, in which:

FIGS. 3A to 3D are flow charts showing a notification control of a notification unit by a controller in accordance with the first embodiment of the present invention;

FIGS. 4A and 4B are examples showing how the notification unit notifies a user of each operation state when a normal and a high-temperature battery pack are mounted, respectively;

DETAILED DESCRIPTION OF THE EMBODIMENTS

Embodiments of the present invention will now be described with reference to the accompanying drawings which form a part hereof.

Figure 1A:
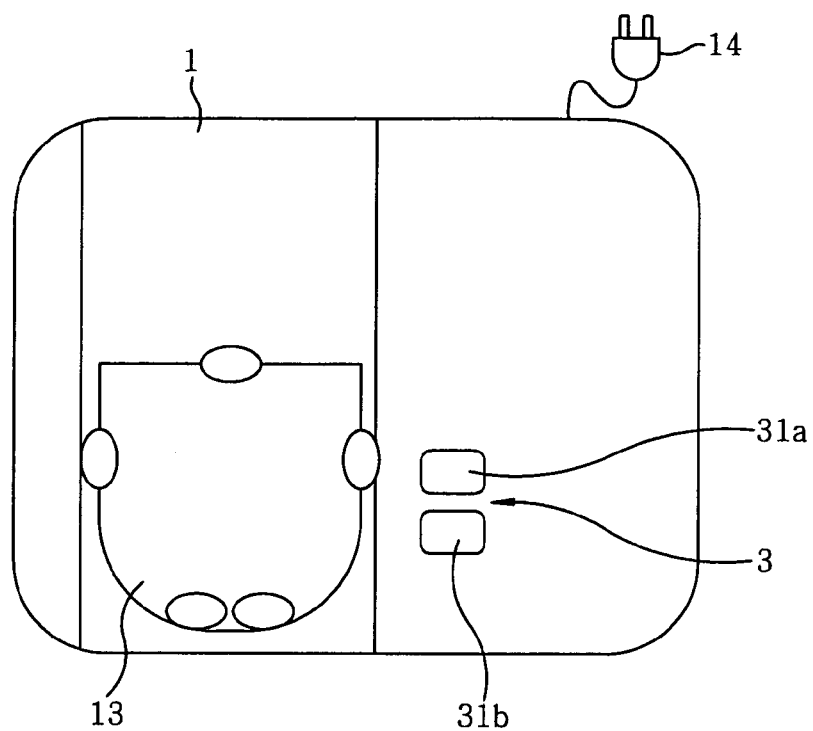
FIGS. 1A and 1B show outer appearances of a charger for an electric power tool for mounting thereon a battery pack and a mounting portion of the battery pack, respectively, in accordance with a first embodiment of the present invention.
Figure 1B:
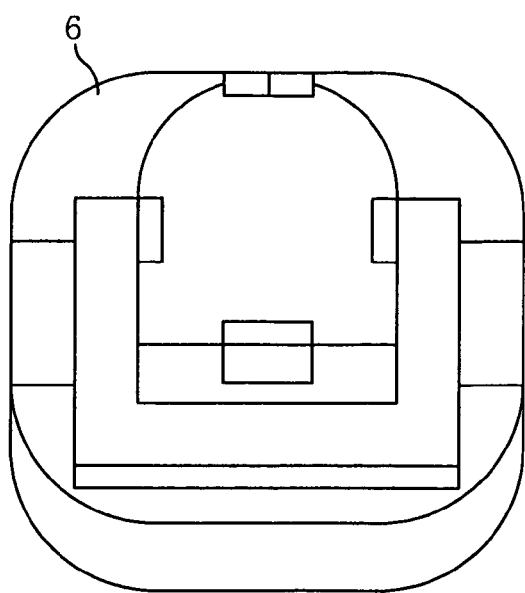

As shown in FIGS. 1A and 1B, a charger 1 for an electric power tool includes a battery pack mounting portion 13 for attachably mounting thereon a battery pack 6 of the electric power tool; a notification unit 3 for notifying each operation state of the charger 1; and an external connection portion 14 for electrically connecting to an external power source.

The notification unit 3 includes, e.g., two light emitting members, e.g., light emitting diodes (LEDs) 31a and 31b which respectively emit different color lights. Each operation state of the charger 1 is notified to the outside world by the turn-on and/or flickering of the light emitting members.

Figure 8:
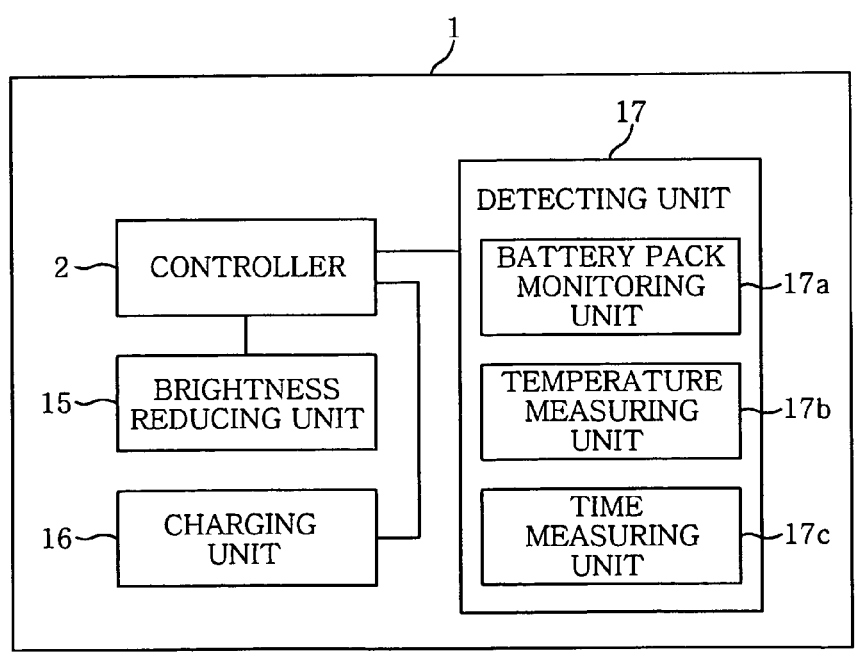
FIG. 8 is a block diagram showing an inner configuration of a charger for an electric power tool in accordance with the first to fourth embodiments.

As shown in FIG. 8, the charger 1 further includes therein a brightness reducing unit 15 for reducing the light brightness of the notification unit 3; a charging unit 16 for charging secondary batteries provided in the mounted battery pack 6; a detecting unit 17 having a battery pack monitoring unit 17a for monitoring whether or not the battery pack 6 is mounted, a temperature measuring unit 17b for measuring a temperature of the battery pack 6, and a time measuring unit 17c for measuring time elapsed during each operation state of the charger 1; and a controller 2 for controlling various components of the charger 1.

Alternatively, the controller 2 may be provided as one single unit with the brightness reducing unit 15 to reduce the light brightness of the notification unit 3 instead of controlling the separate brightness reducing unit 15 to reduce the light brightness of the notification unit 3.

The controller 2, e.g., a microcomputer, controls, based on information detected by the detecting unit 17, the charging unit 16 to charge the secondary battery; and the notification unit 3 to notify each operation state of the charger 1.

Especially, the controller 2 determines a current operation state of the charger 1 and control the notification unit 3 to give a notification corresponding to the determined operation state. Further, if an operation state has been notified for a predetermined time T without change, the controller 2 controls the brightness reducing unit 15 to reduce the light brightness of the notification unit 3 while continuously giving the notification.

In the first embodiment, the controller 2 may serve as the brightness reducing unit 15 for reducing the light brightness of the notification unit 3 as described above. Hereinafter, such a notification given by reducing the light brightness of the notification unit 3 is referred to as "brightness reducing notification," and a notification given by an original brightness level before brightness reduction will be referred to as "original brightness notification."

If the operation state of the charger 1 is changed during the brightness reducing notification, the controller 2 gives the original brightness notification by recovering the reduced brightness to the original brightness level.

Figure 2A:
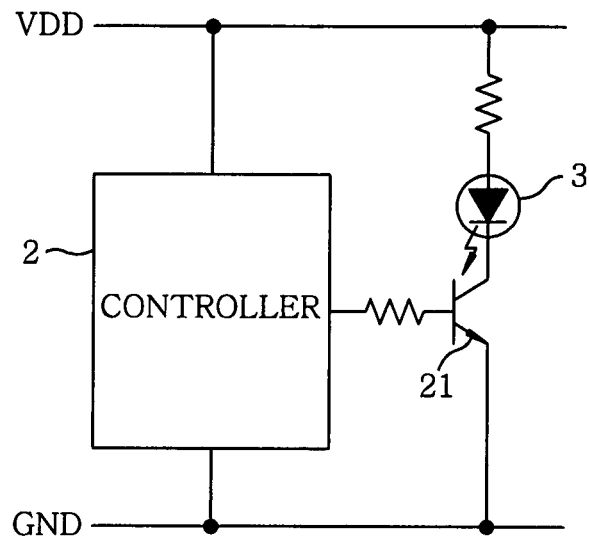
FIGS. 2A and 2B show examples of circuits for reducing brightness of light by pulse width modification and by current variation, respectively, in the charger for an electric power tool in accordance with the first embodiment of the present invention.

For instance, the notification unit 3 is connected to the collector of an n-p-n transistor 21 serving as the brightness reducing unit 3 and the base of the transistor 21 is connected to the controller 2 as shown in FIG. 2A. The controller 2 controls an H/L output to the base to turn on or off the notification unit 3 or allow the notification unit 3 to flicker.

The controller 2 reduces the light brightness of the notification unit 3 by adjusting a duty ratio of the H/L output of the base of the n-p-n transistor 21, to thereby change the original brightness notification to the brightness reducing notification.

In other words, the brightness reducing notification is given by controlling the duty ratio, i.e., setting the H/L output to be limited to, e.g., 5 ms period with 20% ON level to thereby reduce the light brightness of the notification unit 3.

The circuit for reducing the light brightness of the notification unit 3 may be configured either to use pulse width modification by adjusting the duty ratio as described above or to change the current supplied to the notification unit 3.

Figure 2B:
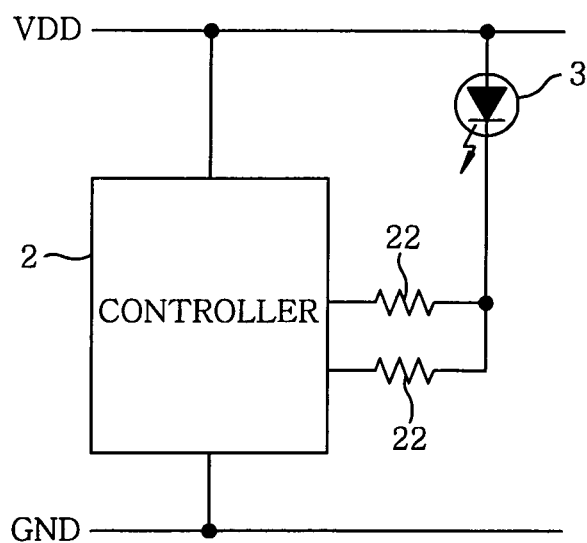
Figure 3B:
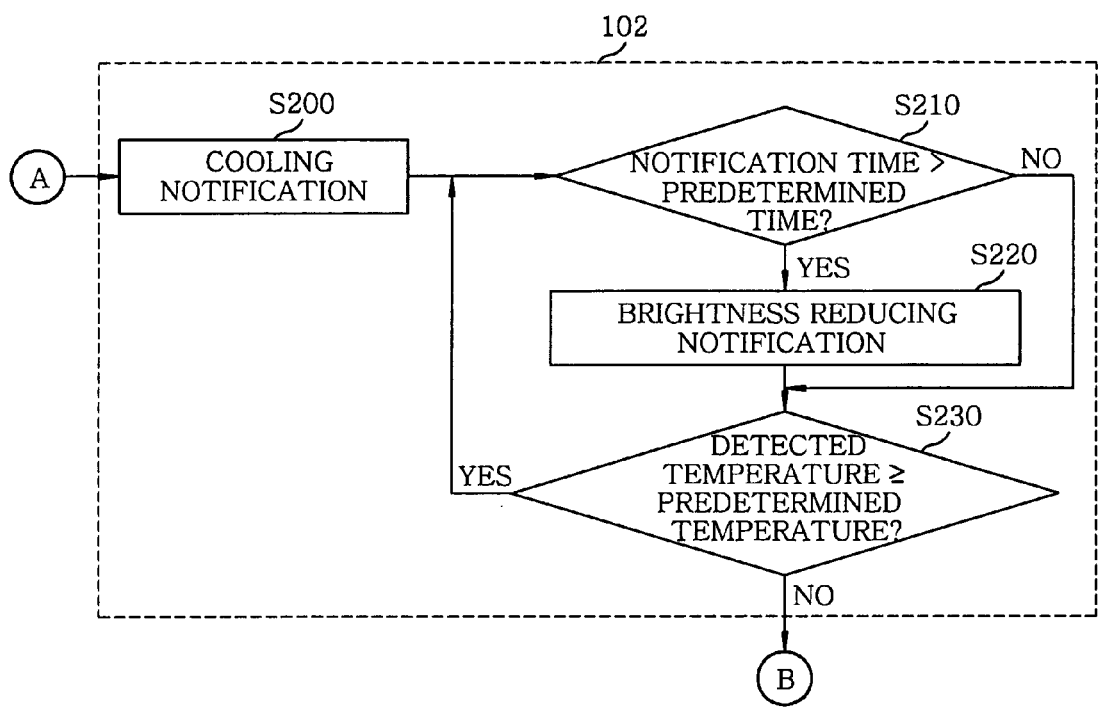
Figure 3D:
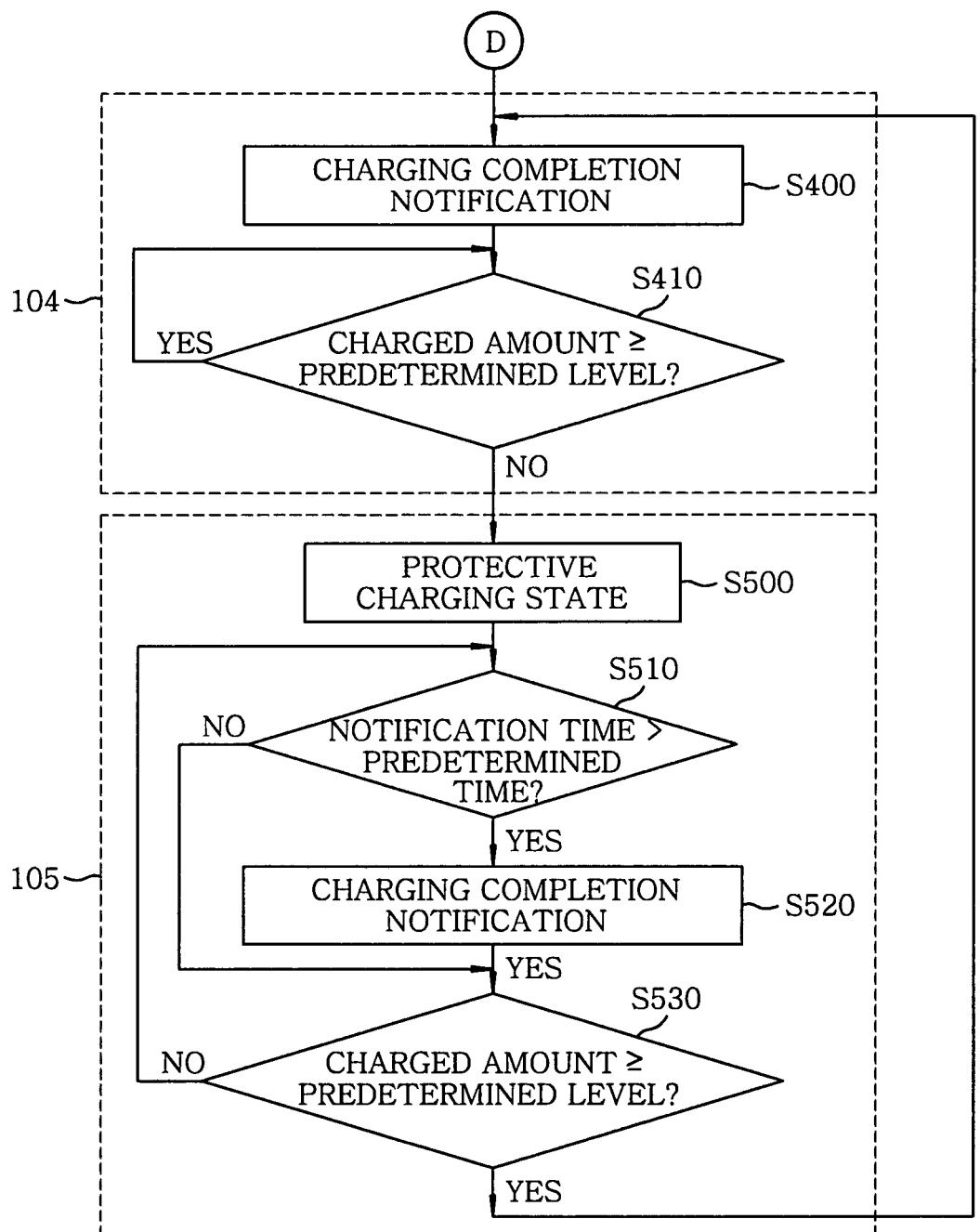

For example, two voltage dividing resistors 22 are provided between the notification unit 3 and the controller 2, as shown in FIG. 2B, such that a magnitude of a current supplied to the notification unit 3 can be changed by switching to select one of two or more different current values. As a result, the original brightness notification is changed to the brightness reducing notification with a reduced brightness determined by the difference of the current values.

Specifically, two kinds of currents are generated, i.e., one by turning on both of the two voltage dividing resistors 22; and the other by turning on only one of the two voltage dividing resistors 22. Then, a current having a greater value is supplied to give the original brightness notification, and a current having a smaller value is supplied to give the brightness reducing notification.

Further, the result caused by changing the current values is different from that caused by changing the above-mentioned duty ratio. In FIGS. 2A and 2B, the notification unit 3 is depicted as a simple LED for simplicity. It should be noted that, by providing transistor 21 and the voltage dividing resistors 22 to each LED of the notification unit 3, the light brightness of the LEDs 31a and 31b of the notification unit 3 can independently be changed; and, thus, the color of the notification unit 3 can be made changed before and after reducing the light brightness.

The control process of the controller 2 for notifying each operation state of the charger 1 by the turn-on, turn-off, flickering and/or the like of the notification unit 3 and for reducing the light brightness will be described with reference to FIGS. 3A to 4B.

If a current is supplied from an external power source to the charger 1 by connecting the external connection portion 14 to the external power source (step S100), the controller 2 allows, e.g., the LED 31a to flicker at a predetermined interval to give an outside world a power connection notification showing that the charger 1 is in the power connection state 101 (step S110). In this example, the notification of the power connection state 101 is maintained until it is checked that the battery pack 6 is mounted on the battery pack mounting portion 13 and it is determined whether the temperature of the mounted battery pack 6 is greater than or equal to a predetermined level.

In step S120, the controller 2 checks whether or not the battery pack 6 is mounted on the battery pack mounting portion 13 based on the result monitored by the battery pack monitoring unit 17a. If it is determined that the battery pack 6 is not mounted on the battery pack mounting portion ("no" in step S120), the controller 2 checks, based on the result measured by the time measuring unit 17c, whether or not a predetermined time T has elapsed without mounting the battery pack 6 on the battery pack mounting portion 13 (step S130).

If it is determined in step S130 that the predetermined time T has elapsed, the controller 2 reduces the light brightness of the flickering LED 31a to notify the power connection state 101 with the brightness reducing notification 106 (step S140) and, then, the process returns to step S120. On the other hand, if it is determined in step S130 that the predetermined time T has not elapsed, the process returns to step S120.

In the meantime, if it is determined in step S120 that the battery pack 6 is mounted on the battery pack mounting portion 13, the controller 2 checks in step S150 whether or not the temperature of the mounted battery pack 6 is equal to or higher than the predetermined level based on the result measured by the temperature measuring unit 17b.

If it is checked in step S150 that the temperature of the battery pack 6 is equal to or higher than the predetermined level, the controller 2 proceeds to the charging standby state 102 to cool the battery pack 6. For example, when the temperature of the battery pack 6 is measured high immediately after, e.g., a high loading operation using the electric power tool, the battery pack 6 needs to be cooled before the charging is started.

When proceeding to the charging standby state 102, the controller 2 turns off the flickering LED 31a and allows the LED 31b to flicker to notify the outside world of a cooling notification 112 showing that the charger 1 moved from the power connection state 101 to the charging standby state 102 (step S200).

The notification of the charging standby state 102 is maintained until the temperature of the battery pack 6 becomes lower than a predetermined level.

In step S210, the controller 2 checks whether or not the predetermined time T has elapsed during the charging standby state 102. If it is determined in step S210 that a predetermined time T has elapsed after starting the charging standby state 102, the controller 2 reduces the light brightness of the flickering LED 31b to notify the charging standby state 102 with the brightness reducing notification 106 for (step S220) and, then, the process goes to a step S230. On the other hand, if it is determined in step S210 that the predetermined time T has not elapsed, the process goes to step S230.

In step S230, the controller 2 checks whether or not the temperature of the mounted battery pack 6 is equal to or higher than a predetermined level. If the temperature of the mounted battery pack 6 is determined in step S230 to be equal to or higher than a predetermined level, the process returns to step S210.

If it is checked in step S150 that the temperature of the mounted battery pack 6 is lower than the predetermined level, or it is determined in step S230 that the mounted battery pack 6 is cooled such that the temperature thereof is lower than the predetermined level, the controller 2 proceeds to the charging state 103 by starting to charge the battery pack 6.

Figure 4B:
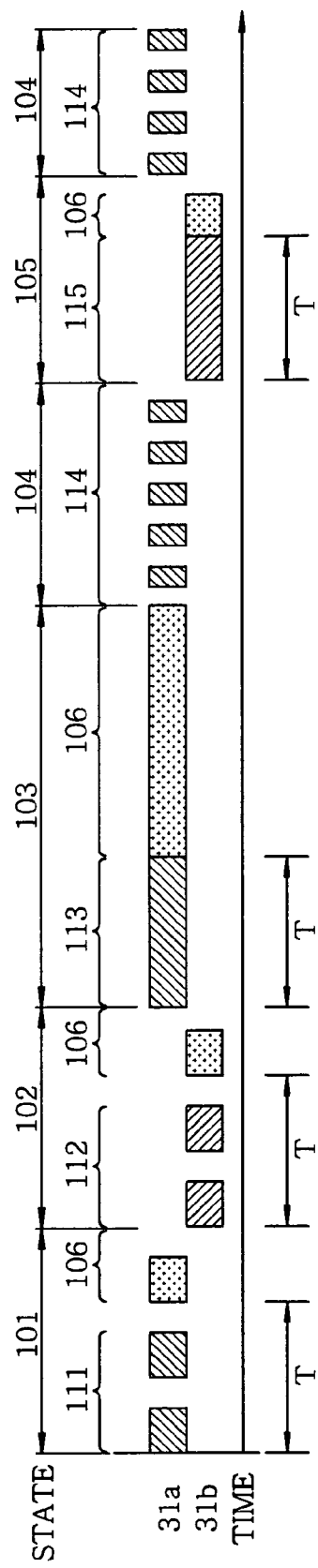

When proceeding to the charging state 103, the controller 2 continuously turns on the flickering LED 31a as shown in FIG. 4A, or turns off the flickering LED 31b and turns on the turned-off LED 31a as shown in FIG. 4B to notify the outside world of a charging notification 113 showing that the charger 1 moved to the charging state 103 (step S300).

The charging state 103 is maintained until an abnormal state is generated in the battery pack 6 or a charged amount of the battery pack 6 reaches a predetermined level.

In step S310, the controller 2 checks whether or not the temperature of the mounted battery pack 6 is equal to or higher than a predetermined level. If the temperature of the mounted battery pack 6 is determined to be equal to or higher than the predetermined level ("yes" in step S310), the controller 2 notifies the outside world of an abnormal state notification 116 showing that the battery pack 6 is in an abnormal state (step S320). On the other hand, if the temperature thereof is determined to be lower than the predetermined level ("no" in step S310), the controller 2 checks whether or not a charged amount of the battery pack 6 has reached a predetermined level (step S330).

If it is checked in step S330 that the charged amount of the battery pack 6 has not reached the predetermined level, the controller 2 checks whether or not the predetermined time T has elapsed after initiating the charging state 103 (step S340). If the result is affirmative in Step S340, the controller 2 reduces the light brightness of the turned-on LED 31a to notify the charging state 103 with the brightness reducing notification 106 (step S350) and, then, the process returns to step S310.

On the other hand, if the result of step S340 is negative, the process returns to step S310.

If it is checked in Step S330 that the charged amount of the battery pack 6 has reached the predetermined level, the charger 1 proceeds to the charging completion state 104 and gives a charging completion notification 114 for the charging completion state 104 by allowing the continuously turned-on LED 31a to more quickly flicker at a predetermined interval that is shorter than that of the power connection state 101 (step S400).

Since the charging completion state 104 is a preferable state for the battery pack 6 of electric power tool and is a state of high importance to a user, the light brightness of the notification unit 3 is not reduced even though the predetermined time T has elapsed after starting the charging completion state 104.

In addition, if an abnormal state or an error is generated, an original brightness notification is also not changed to a brightness reducing notification as in the case during the charging completion state 104. For example, if the battery pack 6 is overheated during charging, so that the temperature thereof is higher than a predetermined level, or the battery pack 6 is not adequately mounted on the battery pack mounting portion 13, the light brightness of the notification unit 3 is not reduced as well.

In other words, the light brightness of the notification unit 3 is not reduced even though the predetermined time T has elapsed during an important state, which requires a user to detach or re-mount the battery pack from or in the battery pack mounting portion 13. The important state can be, e.g., a favorable state such as the charging completion, an abnormal state such as the overheating during charging, or an unfavorable state such as when the battery pack 6 is inadequately mounted.

On the other hand, the light brightness of the notification unit 3 is reduced when the predetermined time T has elapsed during a less-important state, which does not require a user to do a predetermined operation. The less-important state may include a state that the battery pack mounting portion 13 has been left without mounting the battery pack 6 thereon after the charger 1 is connected to the external power source, or the cooling or the charging is performed for a long time.

After step S400, the controller 2 checks whether or not the charged amount of the battery pack 6 has reached a predetermined level (step S410). If the charged amount of the battery pack 6 has reached the predetermined level in step S410, the process repeats step S410.

If it is checked in step S410 that the charged amount of the battery pack 6 is less than the predetermined level, the charger 1 proceeds to a protective charging state 105 to perform protective charging (step S500). For example, the protective charging is performed if the voltage of the charged battery pack 6 becomes lower than a predetermined level due to being affected by the thermal hysteresis, or when the battery pack 6 has been left for a long time after the charging is completed.

When the charger 1 proceeds to the protective charging state 105, the controller 2 turns off the flickering LED 31a and turns on the LED 31b as shown in FIG. 4B to notify the outside world of a protective charging notification 115 showing that the charger 1 is in the protective charging state 105.

In step S510, the controller 2 checks whether or not a predetermined time T has elapsed after starting the protective charging state 105 (step S510). If it is determined in step S510 that the predetermined time T has elapsed, the controller 2 reduces the light brightness of the notification unit 3 to notify the protective charging state 105 with the brightness reducing notification 106 (step S520) and, then, the process returns to step S530.

On the other hand, if it is determined in step S510 that the predetermined time T has not elapsed, the controller 2 checks whether or not the charged amount of the battery pack 6 has reached a predetermined level (step S530). If it is determined that the charged amount of the battery pack 6 has reached the predetermined level in step S530, the process returns to step S400. If it is determined that the charged amount of the battery pack 6 has not reached the predetermined level in step S530, the controller 2 continuously performs the protecting charging and returns to step S510.

In this way, the charger 1 of the first embodiment notifies the operation state by using a constant brightness when the charging is completed or an abnormal state has developed. On the other hand, the charger 1 reduces the light brightness of the notification unit 3 to give the brightness reducing notification when a specific condition is satisfied, i.e., the predetermined time T has elapsed during the power connection state 101, the charging state 103 or the like.

If a specific operation state is changed to another operation state while the charger 1 gives a brightness reducing notification for the specific operation state, the charger 1 notifies the changed operation state by recovering to an original level of brightness from a reduced light brightness of the notification unit 3.

In other words, the original brightness notification is given without reducing the light brightness of the notification unit 3 immediately after the operation state is changed, e.g., the cooling or the charging is started or the charging is completed, or during the important state such as the charging completion state 104. On the other hand, the brightness reducing notification is given by reducing the light brightness of the notification unit 3 during the less-important state such as the power connection state 101 or the charging state 103.

Accordingly, a user can easily check such important notifications of the notification unit 3 and reduce the power consumption during such less important notifications. As a result, the charger 1 of the first embodiment can reduce the power consumption without losing the convenience for usage.

Alternatively, the light brightness of the notification unit 3 may be reduced while the charging completion state 104 is notified; and the notification unit 3 may be turned on constantly during the power connection state 101 or flicker during the charging state 103 when corresponding notifications are given. The method of notifying each of the operation states may be adequately designed in various ways.

Further, the notification unit 3 is not limited to the two LEDs 31a and 31b. Alternatively, one or three or more light emitting members may be employed to make a plurality of combinations of the constant turn-on and flickering of different periods. Further, the light brightness of the light emitting members may be reduced while the notification is given to reduce power consumption.

Figure 5A:
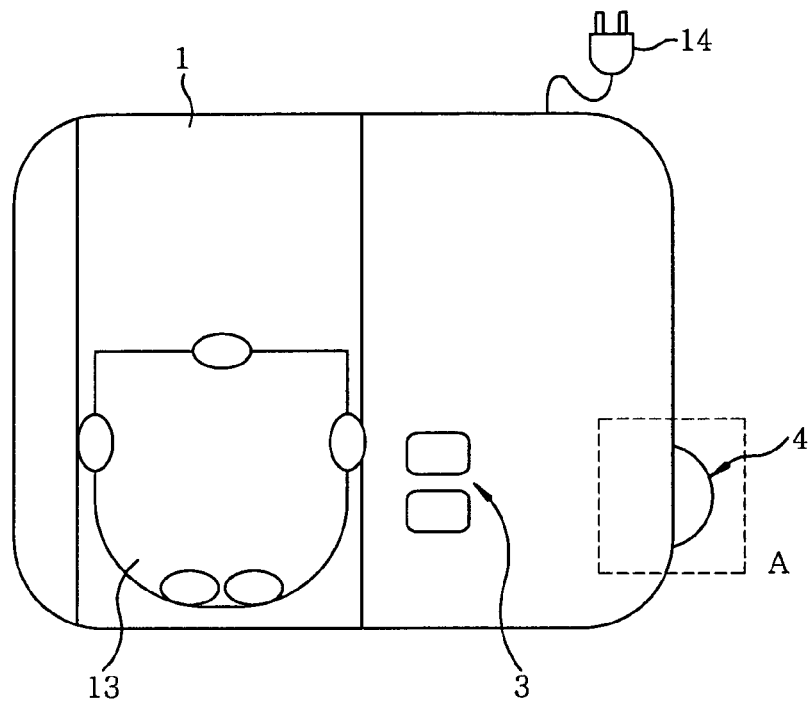
FIG. 5A shows an outer appearance of a charger for an electric power tool in accordance with a second embodiment of the present invention.

The charger 1 including a brightness reducing time changing unit 4 in accordance with a second embodiment will be described with reference to FIGS. 5A and 5B. In the first and the second embodiment, identical or corresponding elements will be given the same reference numerals; and redundant description thereof will not be repeated. The feature of the present embodiment will be described hereinafter.

In the second embodiment, the charger 1 includes the brightness reducing time changing unit 4 as described above; and the predetermined time T for reducing the light brightness of the notification unit 3 can be changed by externally manipulating a dial type manipulation unit 41 of the brightness reducing time changing unit 4.

Figure 5B:
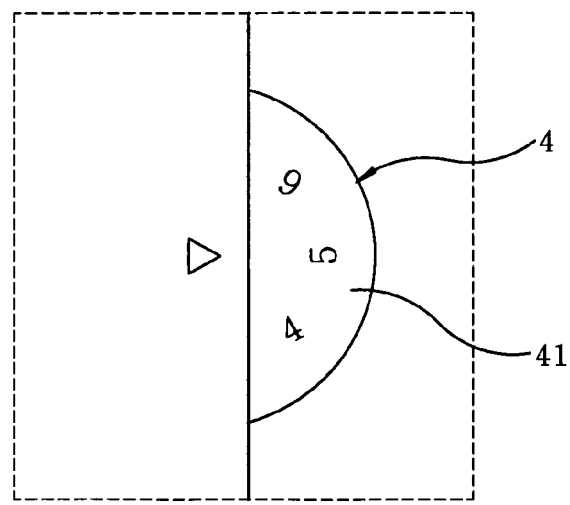
FIG. 5B is an enlarged view showing a portion A shown in FIG. 5A.

For example, if a manipulation level is set to be "5" by manipulating the manipulation unit 41 as shown in FIG. 5B and if 5 minutes has elapsed during, e.g., the power connection state 101 or the charging state 103 without change, the controller 2 recognizes that the predetermined time T corresponding to the settings has elapsed and changes an original brightness notification to the brightness reducing notification 106.

Further, if the manipulation level is set to be "0" for example, the brightness reducing notification 106 is not to be given and the controller 2 does not reduce the light brightness of the notification unit 3.

In other words, a user can change the predetermined time T for reducing the light brightness of the notification unit 3 by adjusting the manipulation level, to thereby enable the charger 1 to give the brightness reducing notification 106 after a desired period of time.

The shape of the manipulation unit 41 is merely an example; alternatively, the manipulation unit 41 may be embodied in a button type, a slide type or the like instead of the dial type. The manipulation unit 41 may be adequately designed to change the setting level of the predetermined time T. The above-mentioned manipulation level is merely an example. Alternatively, such manipulation level may be set in terms of 15 minutes unit or differently selectable for each operation state.

Figure 6:
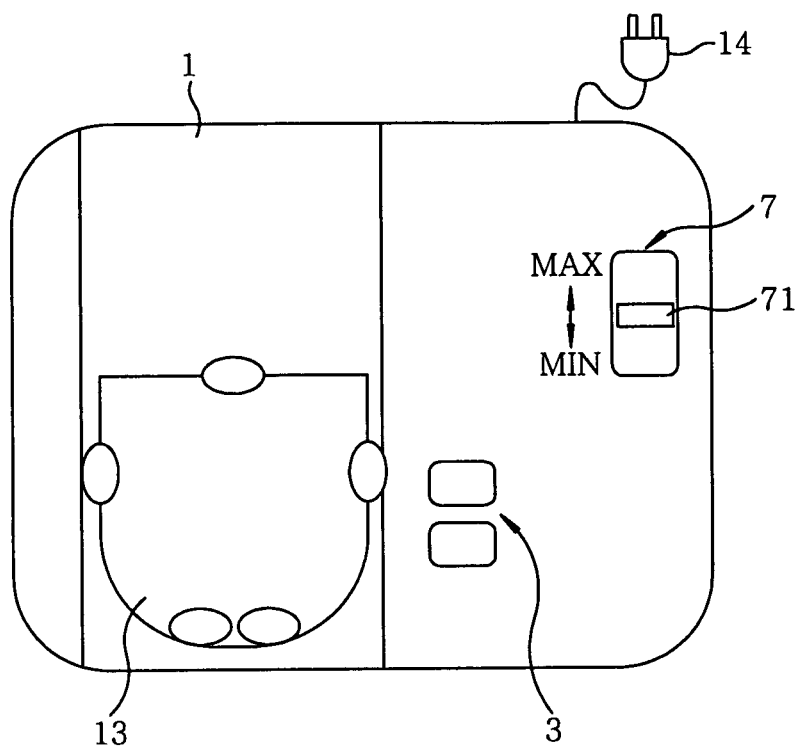
FIG. 6 shows an outer appearance of a charger for an electric power tool in accordance with a third embodiment of the present invention.

The charger 1 including a brightness adjusting unit 7 in accordance with a third embodiment will be described with reference to FIG. 6. In the aforementioned embodiments and the third embodiment, identical or corresponding elements will be given the same reference numerals; and redundant description thereof will not be repeated. The feature of the present embodiment will be described hereinafter.

In the third embodiment, the charger 1 includes the brightness adjusting unit 7 as described above; and the light brightness of the notification unit 3 can be adjusted by externally manipulating a slide type manipulation unit 71 of the brightness adjusting unit 7.

For example, if the manipulation unit 71 is set to slide to a level closer to a minimum level (MIN), the light brightness of the notification unit 3 during the brightness reducing notification 106 gets darker than that before changing the setting. Further, if the manipulation unit is set to slide to MIN, the notification unit 3 is turned off when the brightness reducing notification 106 is given.

On the other hand, if the manipulation unit is set to slide to a level closer to a maximum level (MAX), the light brightness of the notification unit 3 during the brightness reducing notification 106 gets brighter than that before changing the setting. Further, if the manipulation unit is set to slide to MAX, the light brightness of the notification unit 3 is not reduced even after the predetermined time T.

In this way, the reduced light brightness of the notification unit 3 can be adjusted by using the brightness adjusting unit 7, thereby enabling a user to adjust the light brightness of the brightness reducing notification 106 as desired.

In addition, a user can allow the light brightness of the notification unit 3 not to be reduced by setting the light brightness as the maximum level substantially identical to that of the turned-on or flickering notification unit 3 before the reduction. Further, the user can set the light brightness as the minimum level substantially identical to that of the turned-off notification unit 3 in order to turn off the notification unit 3 when the brightness reducing notification 106 is issued.

The shape of the manipulation unit 7 is merely an example. Alternatively, the manipulation unit 7 may be embodied in a button type, a dial type or the like instead of the slide type. The manipulation unit may be adequately designed to adjust the light brightness of the notification unit 3 when the brightness thereof is reduced.

Figure 7:
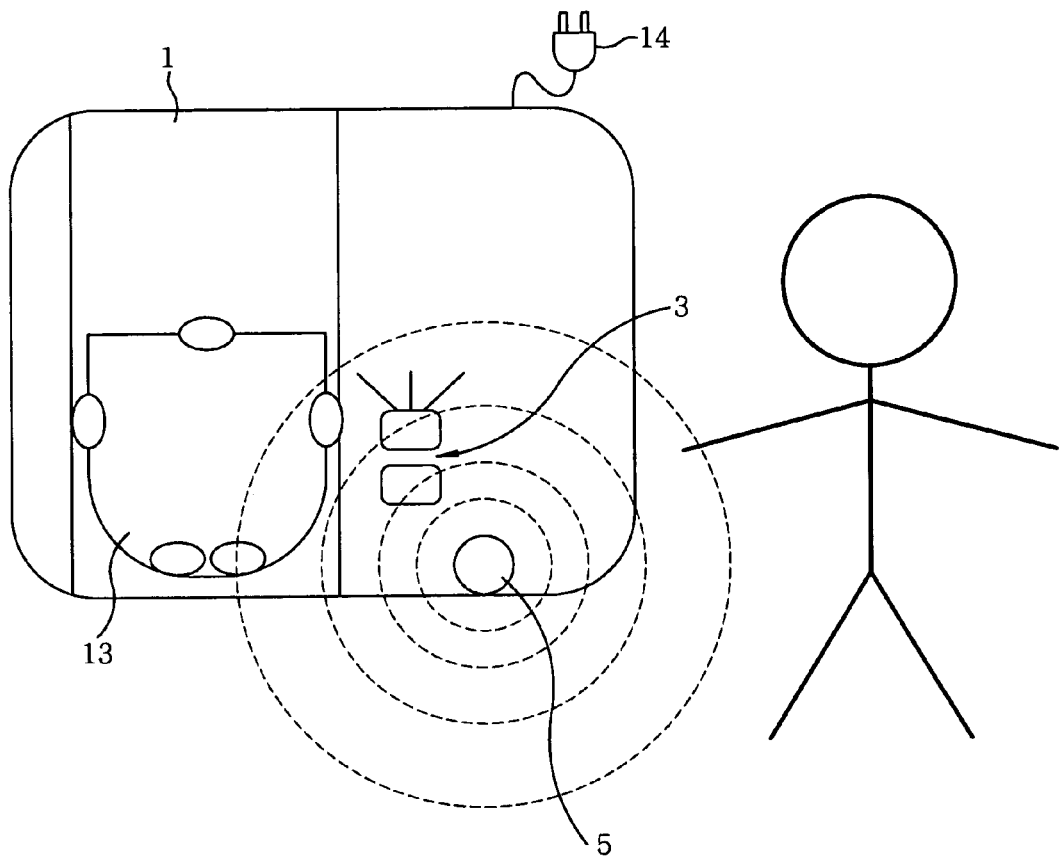
FIG. 7 shows a charger for an electric power tool in accordance with a fourth embodiment of the present invention.

The charger 1 including a body sensor 5 in accordance with a fourth embodiment will be described with reference to FIG. 7. In the aforementioned embodiments and the fourth embodiment, identical or corresponding elements will be given the same reference numerals; and redundant description thereof will not be repeated. The feature of the present embodiment will be described hereinafter.

In the fourth embodiment, the charger 1 includes the body sensor 5 therein as described above; and, based on information sensed by the body sensor 5, the controller 2 adjust the light brightness of the notification unit 3 to be switched between the normal brightness notification without brightness reduction and the brightness reducing notification 106 with brightness reduction.

Specifically, when a human body is sensed by the body sensor 5, the controller 2 maintains the light brightness of the notification unit 3 while giving the original or normal brightness notification. When the body sensor 5 is not able to sense the human body that has moved away therefrom, the controller 2 reduces the brightness thereof to give the brightness reducing notification.

If the body sensor 5 starts to sense the human body again during the brightness reducing notification 106, the controller 2 gives the original brightness notification by recovering to the original state the light brightness of the notification unit 3.

By providing the body sensor 5, the power consumption of the charger 1 can be reduced during the absence of a notification target, i.e., a user, therearound and by changing the original brightness notification to the brightness reducing notification 106 when the notification target has moved away from the charger 1.

In addition, such brightness reduction control by using the body sensor 5 in accordance with the present embodiment can be performed in combination with the brightness reduction control based on the predetermined time T in accordance with the first embodiment. For example, although the body sensor 5 senses the notification target, the original brightness notification for the less-important state can be changed to the brightness reducing notification when the predetermined time T has elapsed since the original brightness notification.

It is to be noted to a person in the art that each of the first to the fourth embodiment can be combined with one of the more other embodiments.

While the invention has been shown and described with respect to the embodiments, it will be understood by those skilled in the art that various changes and modifications may be made without departing from the scope of the invention as defined in the following claims.

What is claimed is:

1. A charger for an electric power tool, the charger comprising:
    a charging unit for charging a secondary battery detachably attached to the charger;
    a notification unit for notifying an operation state of the charging unit by using a combination of a turn-on and turn-off of the notification unit;
    a brightness reducing unit for reducing a light brightness of the notification unit; and
    a controller for controlling the notification unit and the brightness reducing unit,
    wherein, if a predetermined time has elapsed during one of one or more predetermined operation states of the charging unit without change, the controller controls the brightness reducing unit to reduce the light brightness of the notification unit,
    wherein said one or more predetermined operation states do not include a charging completion state and an abnormal state.

2. The charger of claim 1, further comprising a brightness reducing time changing unit for changing the predetermined time.

3. The charger of claim 1, further comprising a brightness adjusting unit for adjusting a reduced light brightness of the notification unit.

4. The charger of claim 1, wherein, if the operation state of the charging unit is changed while a notification is given by reducing the light brightness of the notification unit, the controller recovers to an original level of the brightness from the brightness thereof reduced by the brightness reducing unit; and controls the notification unit to notify the changed operation state.

5. The charger of claim 1, wherein, if the charger is in a specific operation state, the controller controls the brightness reducing unit not to reduce the light brightness of the notification unit.

6. The charger of claim 1, further comprising a body sensor for sensing a human body,
wherein, while the human body is sensed by the body sensor, the controller controls the brightness reducing unit not to reduce the light brightness of the notification unit.

7. A charger for an electric power tool, the charger comprising:
a charging unit for charging a secondary battery detachably attached to the charger;
a notification unit for notifying an operation state of the charging unit by using a combination of a turn-on and turn-off of the notification unit;
a brightness reducing unit for reducing a light brightness of the notification unit; and
a controller for controlling the notification unit and the brightness reducing unit,
wherein, if an operation state of the charging unit satisfies a specific condition, the controller controls the brightness reducing unit to reduce the light brightness of the notification unit,
wherein, if a predetermined time has elapsed during the operation state without change, the controller controls the brightness reducing unit to reduce the light brightness of the notification unit, and
wherein the charger further comprises a brightness reducing time changing unit for changing the predetermined time.

8. The charger of claim 7, further comprising a brightness adjusting unit for adjusting a reduced light brightness of the notification unit.

9. The charger of claim 7, wherein, if the operation state of the charging unit is changed while a notification is given by reducing the light brightness of the notification unit, the controller recovers to an original level of the brightness from the brightness thereof reduced by the brightness reducing unit; and controls the notification unit to notify the changed operation state.

10. The charger of claim 7, wherein, if the charger is in a specific operation state, the controller controls the brightness reducing unit not to reduce the light brightness of the notification unit.

11. A charger for an electric power tool, the charger comprising:
a charging unit for charging a secondary battery detachably attached to the charger;
a notification unit for notifying an operation state of the charging unit by using a combination of a turn-on and turn-off of the notification unit;
a brightness reducing unit for reducing a light brightness of the notification unit; and
a controller for controlling the notification unit and the brightness reducing unit,
wherein, if an operation state of the charging unit satisfies a specific condition, the controller controls the brightness reducing unit to reduce the light brightness of the notification unit,
wherein the charger further comprises a body sensor for sensing a human body, and
wherein, while the human body is sensed by the body sensor, the controller controls the brightness reducing unit not to reduce the light brightness of the notification unit.

12. The charger of claim 11, further comprising a brightness adjusting unit for adjusting a reduced light brightness of the notification unit.

13. The charger of claim 11, wherein, if the operation state of the charging unit is changed while a notification is given by reducing the light brightness of the notification unit, the controller recovers to an original level of the brightness from the brightness thereof reduced by the brightness reducing unit; and controls the notification unit to notify the changed operation state.

14. The charger of claim 11, wherein, if the charger is in a specific operation state, the controller controls the brightness reducing unit not to reduce the light brightness of the notification unit.

* * * * *